(12) United States Patent
Latham et al.

(10) Patent No.: US 11,662,260 B2
(45) Date of Patent: May 30, 2023

(54) LINEAR INDUCTIVE TORQUE SENSOR

(71) Applicant: Allegro MicroSystems, LLC, Manchester, NH (US)

(72) Inventors: Alexander Latham, Harvard, MA (US); Hernán D. Romero, Buenos Aires (AR)

(73) Assignee: Allegro MicroSystems, LLC, Manchester, NH (US)

( * ) Notice: Subject to any disclaimer, the term of this patent is extended or adjusted under 35 U.S.C. 154(b) by 119 days.

(21) Appl. No.: 17/466,202

(22) Filed: Sep. 3, 2021

(65) Prior Publication Data

US 2023/0077015 A1 Mar. 9, 2023

(51) Int. Cl.
G01L 3/10 (2006.01)
G01L 5/22 (2006.01)

(52) U.S. Cl.
CPC .............. G01L 3/105 (2013.01); *G01L 5/221* (2013.01)

(58) Field of Classification Search
CPC ................................ G01L 3/105; G01L 5/221
See application file for complete search history.

(56) References Cited

U.S. PATENT DOCUMENTS

| 4,356,732 | A | 11/1982 | Hachtel et al. | |
|---|---|---|---|---|
| 8,453,518 | B2 | 6/2013 | Diekmann et al. | |
| 9,983,045 | B2 | 5/2018 | O'Neill | |
| 10,330,499 | B2 | 6/2019 | Elliott et al. | |
| 10,837,847 | B2 * | 11/2020 | Smith, Jr. | ............... G01L 5/221 |
| 10,837,848 | B2 * | 11/2020 | Janisch | ................ G01D 5/2053 |
| 11,079,291 | B2 | 8/2021 | Bertin | |
| 11,112,275 | B2 | 9/2021 | Bertin | |
| 11,408,755 | B2 | 8/2022 | Bertin | |
| 2006/0250128 | A1 * | 11/2006 | Tahara | ................ G01D 5/2086 |
| | | | | 324/207.25 |
| 2019/0331541 | A1 | 10/2019 | Janisch et al. | |
| 2020/0109996 | A1 | 4/2020 | Smith, Jr. | |
| 2022/0357144 | A1 | 11/2022 | Tombez | |

OTHER PUBLICATIONS

U.S. Appl. No. 17/097,498, filed Nov. 13, 2020, Casu et al.
U.S. Appl. No. 17/120,395, filed Dec. 14, 2020, Casu et al.
PCT International Search Report and Written Opinion dated Sep. 19, 2022 for International Application No. PCT/US2022/033577; 13 Pages.

* cited by examiner

*Primary Examiner* — Freddie Kirkland, III
(74) *Attorney, Agent, or Firm* — Daly Crowley Mofford & Durkee, LLP

(57) ABSTRACT

Methods and apparatus for linear inductive torque sensing that may include transmitting an AC magnetic field with a transmit coil toward a conductive target and receiving a field reflected by the conductive target with a receive coil, wherein the conductive target comprises first and second targets positioned with respect to each other and each shaped to linearly increase or decrease an amount of conductive area of the conductive target due to relative movement of the first and second targets which changes an amount of the field reflected by the conductive target. A signal from the receive coil can be processed to determine a relative position of the first and second targets corresponding to an amount of torque on an elongate member connected to the first and second targets. In other embodiments, a change in inductance of the transmit coil is measured to determine relative target position.

23 Claims, 14 Drawing Sheets

LINEAR INDUCTIVE TORQUE SENSOR

BACKGROUND

As is known in the art, inductive rotary sensors are a type of position sensor used to detect the position and/or speed, for example, of a rotating target. In particular, inductive rotary sensors can be used to detect the position of a gear or another moving element in a mechanical system. They are frequently used in automated control applications, such as automated control applications in automobiles or industrial equipment, for example.

Inductive position sensors generally include a primary, or transmitting coil that generates a biasing field in response to an oscillation signal and one or more secondary, or receiving coils electromagnetically coupled to the primary coil for generating one or more secondary signals. The secondary signal can be processed to detect a position of a target arranged such that the coupling between the primary and secondary coils is a function of the target position. For example, the target can comprise a conductive sheet with features, and the primary and secondary coils sit above or below it. Depending on the position of the features in the target relative to the primary and secondary coils, the mutual inductance between them changes In general, the target position information is amplitude modulated in the secondary signal that can be demodulated synchronously with respect to the primary oscillation in order to extract target position information. In one example configuration, two secondary coils are arranged to generate respective secondary signals that contain amplitude modulated sine and cosine information that can be processed to determine target angle.

SUMMARY

Embodiments of the disclosure provide methods and apparatus for linear inductive torque sensing. In embodiments, torque measurement is performed by measuring the relative angle between first and second targets located on opposite sides of an elongate member, such as a torsion bar. Conventional inductive sensing measures the angle of multiple targets separately and subtracts them to obtain torque information with a stationary PCB and drive and pick-up coils located between the targets.

In example embodiments, a sensing system includes multiple shaped targets and a coil configuration to differentially measure torque inductively with a linear response. This arrangement significantly reduces the number of coils and ADC channels needed as compared with known sensing systems.

In some embodiments, the first and second conductive targets are configured to have open regions and closed regions such that a size of windows formed by overlap of the first and second targets corresponds to a relative position of the targets. In some embodiments, the targets are configured to rotated in opposite directions in the presence of torque. The coil configuration and target shape enables differential measurement of the torque where direct coupling from the drive coil is cancelled out. In embodiments, the inductance of the drive coil is close to constant.

In embodiments, a circuit board for the coils and sensing circuitry can be located above or below the targets which enhances manufacture. In embodiments, the circuit board can be located between the targets.

In embodiments, the areas of the windows in the target, which may comprise rings, are generally equal to obtain a balanced differential response. The drive coil can create a field at a given frequency into the total conductive area of the targets. In some embodiments, the signal pickup coil comprises a differential coil that winds positively for the inner ring and negatively for the outer ring. With this arrangement, a differential signal proportional to the relative rotation of the two targets is generated. In other embodiments, a reference pick-up coil senses the total target area, or a portion of it, to create a signal that is proportional to the drive and reflection for calibration and/or normalization.

In one aspect, a method comprises: transmitting an AC magnetic field with a transmit coil toward a conductive target; receiving a field reflected by the conductive target with a receive coil, wherein the conductive target comprises first and second targets positioned with respect to each other and each shaped to linearly increase or decrease an amount of conductive area of the conductive target hit by the transmit field due to relative movement of the first and second targets, which changes an amount of the field reflected by the conductive target; and processing a signal from the receive coil to determine a relative position of the first and second targets corresponding to an amount of torque on an elongate member connected to the first and second targets.

A method can further include one or more of the following features: the first and second targets have substantially identical size, the first and second targets have substantially identical conductive area, the first and second targets have a ring-shape, the receive coil comprises an inner region and an outer region, the transmit coil is configured to transmit the AC magnetic field to cover the total area of the conductive target, the receive coil inner region is wound in an opposite direction as the outer region, relative rotation of the first and second targets in a first direction increases the conductive area of the conductive target in the inner region and decreases the conductive area of the conductive target in the outer region, relative rotation of the first and second targets in a second direction opposite the first direction decreases the conductive area of the conductive target in the inner region and increases the conductive area of the conductive target in the outer region, the first and second targets have a ring-shape, and wherein the receive coil comprises an inner region and an outer region that are separate coils, the first and second targets have a ring-shape each having an inner annular area having a first width and an outer annular area having a second width, wherein the receive coil comprises an inner region with the first width and an outer region having the second width, the first target, the second target, and a circuit board having a sensor IC are stacked parallel to each other, and/or the transmit and receive coil cover an integer number of teeth of the first target.

In another aspect, a sensing system comprises: a transmit coil to transmit an AC magnetic field toward a conductive target; a receive coil to receive a field reflected by the conductive target, wherein the conductive target comprises first and second targets positioned with respect to each other and each shaped to linearly increase or decrease an amount of conductive area of the conductive target hit by the transmit field due to relative movement of the first and second targets, which changes an amount of the field reflected by the conductive target; and a circuit to process a signal from the receive coil to determine a relative position of the first and second targets corresponding to an amount of torque on an elongate member connected to the first and second targets.

A system can further include one or more of the following features: the first and second targets have substantially identical size, the first and second targets have substantially identical conductive area, the first and second targets have a ring-shape, the receive coil comprises an inner region and an outer region, the transmit coil is configured to transmit the AC magnetic 100 field to cover the total area of the conductive target, the receive coil inner region is wound in an opposite direction as the outer region, relative rotation of the first and second targets in a first direction increases the conductive area of the conductive target in the inner region and decreases the conductive area of the conductive target in the outer region, relative rotation of the first and second targets in a second direction opposite the first direction decreases the conductive area of 105 the conductive target in the inner region and increases the conductive area of the conductive target in the outer region, the first and second targets have a ring-shape, and wherein the receive coil comprises an inner region and an outer region that are separate coils, the first and second targets have a ring-shape each having an inner annular area having a first width and an outer annular area having a second width, wherein the receive coil comprises an inner region with the 110 first width and an outer region having the second width, the first target, the second target, and a circuit board having a sensor IC are stacked parallel to each other, and/or the transmit and receive coil cover an integer number of teeth of the first target.

In a further aspect, a method comprises: transmitting an AC magnetic field with a transmit coil 115 toward a conductive target, wherein the conductive target comprises first and second targets positioned with respect to each other and each shaped to linearly increase or decrease an amount of conductive area of the conductive target hit by the transmit field due to relative movement of the first and second targets which changes an amount of the field reflected by the conductive target; and measuring a change in inductance of the conductive target to determine a relative position of the first and second targets corresponding to an amount of torque on an elongate member connected to the first and second targets.

A method can further include one or more of the following features: the first and second targets have substantially identical size, the first and second targets have substantially identical conductive area, the first and second targets have a ring-shape, the transmit coil is configured to transmit the AC magnetic field to cover the total area of the conductive target, the first target, the second target, and a circuit board having a sensor IC are stacked parallel to each other, and/or the transmit coil covers an integer number of teeth of the first target.

In a further aspect, a system comprises: a transmit coil to transmit an AC magnetic field toward a conductive target, wherein the conductive target comprises first and second targets positioned with respect to each other and each shaped to linearly increase or decrease an amount of conductive area of the conductive target hit by the transmit field due to relative movement of the first and second targets which changes an amount of the field reflected by the conductive target; and a processing module to measure a change in inductance of the conductive target to determine a relative position of the first and second targets corresponding to an amount of torque on an elongate member connected to the first and second targets.

A system can further include one or more of the following features: the first and second targets have substantially identical size, the first and second targets have substantially identical conductive area, the first and second targets have a ring-shape, the transmit coil is configured to transmit the AC magnetic field to cover the total area of the conductive target, the first target, the second target, and a circuit board having a sensor IC are stacked parallel to each other, and/or the transmit coil covers an integer number of teeth of the first target.

BRIEF DESCRIPTION OF THE DRAWINGS

The foregoing features may be more fully understood from the following description of the drawings in which.

DETAILED DESCRIPTION

Figure 1:
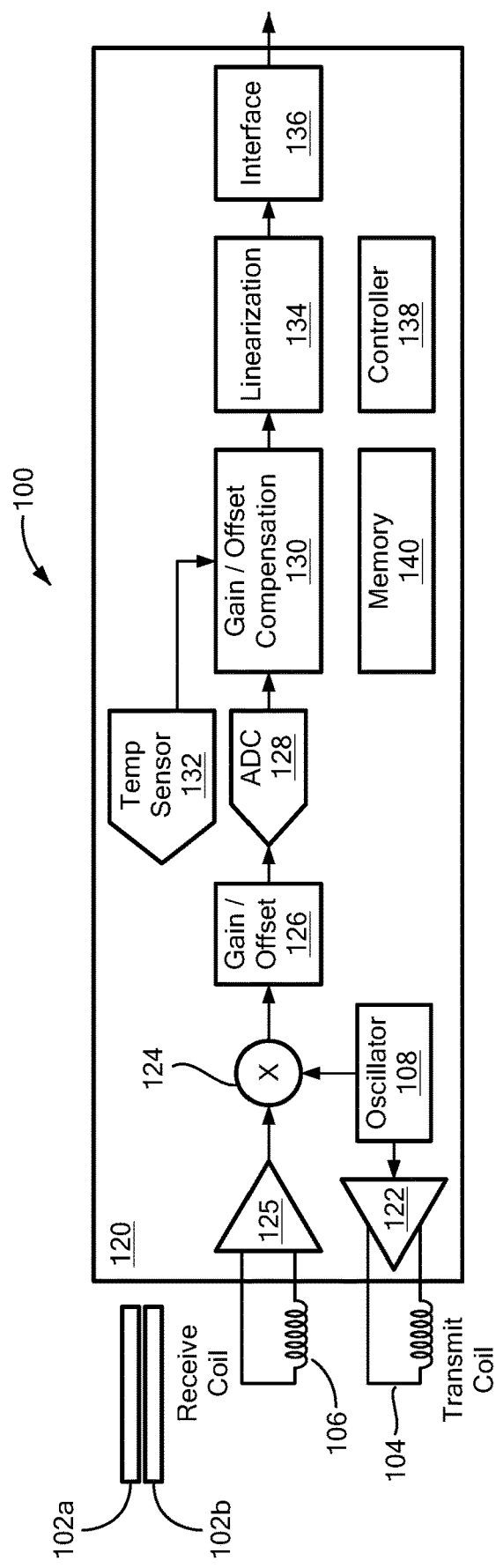
FIG. 1 is a schematic representation of an example linear inductive torque sensing system in accordance with illustrative embodiments of the disclosure.

FIG. 1 shows an example system 100 for inductively sensing a position of a target 102a,b using a transmit coil 104 and a receive coil 106. An oscillator 108 generates an oscillation signal having a carrier frequency and a primary phase. The transmit/primary coil 104 is configured to receive and/or transmit the oscillation signal and the receive/secondary coil 106 is electromagnetically coupled to the primary coil and configured to generate a secondary signal having the carrier frequency and a secondary phase. The coupling between the transmit and receive coils 104, 106 is a function of the target 102 position, which may have a particular shape to change the magnitude of the field reflected by the target. In an example embodiment, the target 102 comprises a metallic object(s), which may be nonferromagnetic, and the transmit coil 104 induces eddy currents in the target 102, which eddy currents, in turn induce a signal (i.e., the secondary signal) in the receive coil 106. As the target 102 moves (e.g., rotates), the coupling between the transmit coil 104 and the receive coil 106 changes, so as to thereby encode target position information by way of amplitude modulation of the secondary signal. It will be appreciated that various mechanical configurations for the target and coils 104, 106 are possible.

An example sensor circuit 120 includes the oscillator 108 which may be coupled to an amplifier 122 for amplifying the signal for the transmit coil 104. A demodulator 124 may remove a signal from amplifier 125 at the frequency of oscillator 108 to enable processing of the amplified 125 reflected signal from the target 102 received by receive coil 106. Gain and offset compensation 126 can be performed on the output signal from the demodulator 124 prior to digitizing the signal with an analog-to-digital (ADC) 128. Further gain and offset compensation 130, such as for temperature 132, can be performed on the digitized signal. Linearization 134 can be performed on the signal prior to output of the signal by an interface module 136, which may serialize the output signal. A controller 138 and memory 140 can control configuration and operation of the sensor IC 120.

Figure 2:
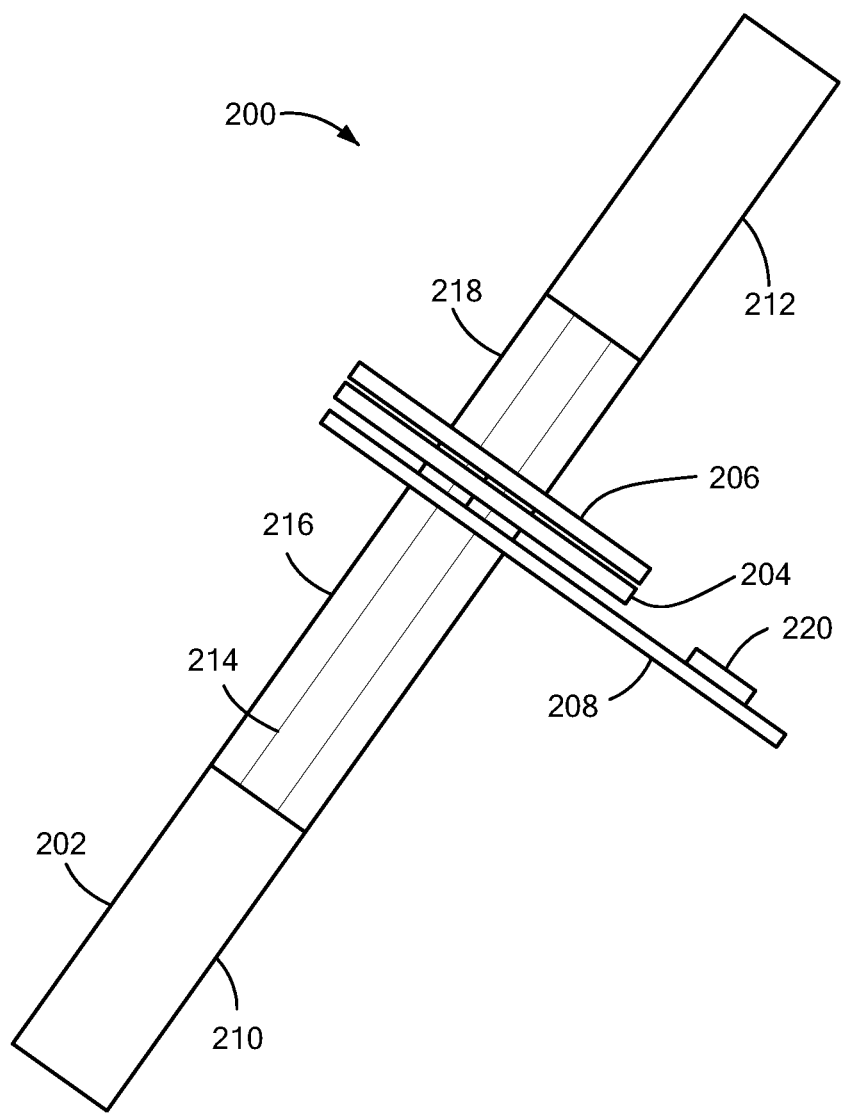
FIG. 2 is a schematic representation of an example implementation of a linear inductive torque sensing system for sensing torque on an elongate member.

FIG. 2 is a block diagram of an example linear inductive torque sensor system 200 configured to determine torque for an elongate member 202 using shaped targets in accordance with illustrative embodiments of the disclosure. In embodiments, the system 200 measures the relative angle of first and second concentric conductive targets 204, 206 that may be close to each other and located above a transmit coil (not shown) on a circuit board 208. The transmit coil creates an AC magnetic field in a sensing area. The targets 204, 206 may be shaped such that when they rotate relative to each other the amount of the sensing area which is covered by the target linearly increases and/or decreases. The sensor detects this change by measuring the inductance change in the transmit coil and/or by using one or more receive coils to sense the change in the amount of reflected field from the targets 204, 206.

In the illustrated embodiment, the elongate member 202 comprises a steering column having a first end 210 coupled to rack (not shown) in a vehicle and a second end 212 coupled to a steering wheel (not shown). A torsion bar 214 connects the first and second ends 210, 212 of the steering column 202. A first sheath 216 may surround the torsion bar 214 and connect the rack-end 210 of steering column to the first target 204 and a second sheath 218 may connect the column-end 212 of the steering column to the second target 206. As described more fully below, the first and second targets 204, 206 are shaped to enable differential sensing of relative target movement in response to torque in the steering column using transit and receive coils on the circuit board 208.

One or more IC packages 220 can be located on the circuit board 208 to control transmit coil operation and process receive coil information.

Figure 3B:
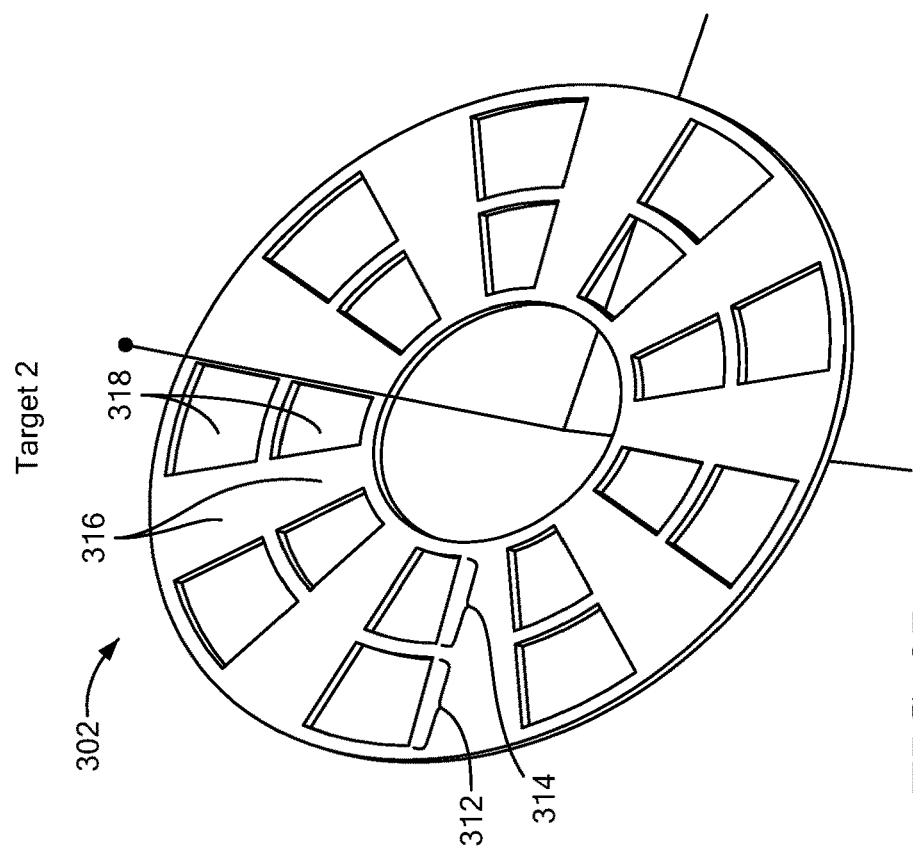
FIG. 3B shows an isometric view of an example second target configuration.
Figure 3A:
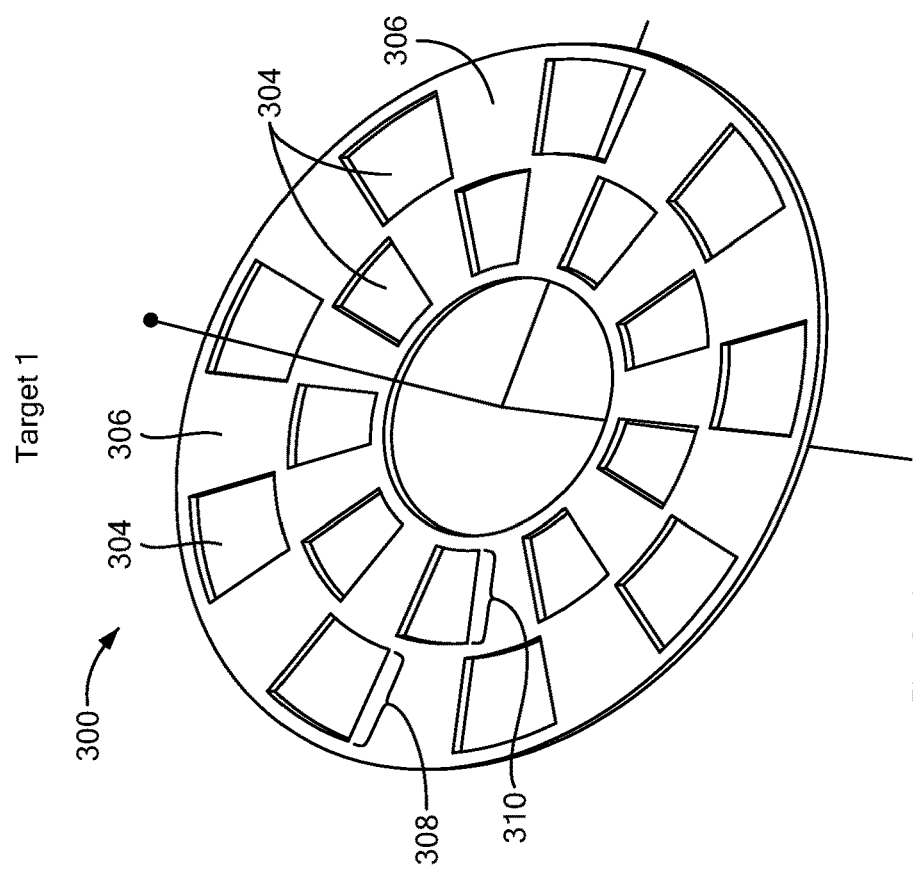
FIG. 3A shows an isometric view of an example first target configuration.
Figure 3D:
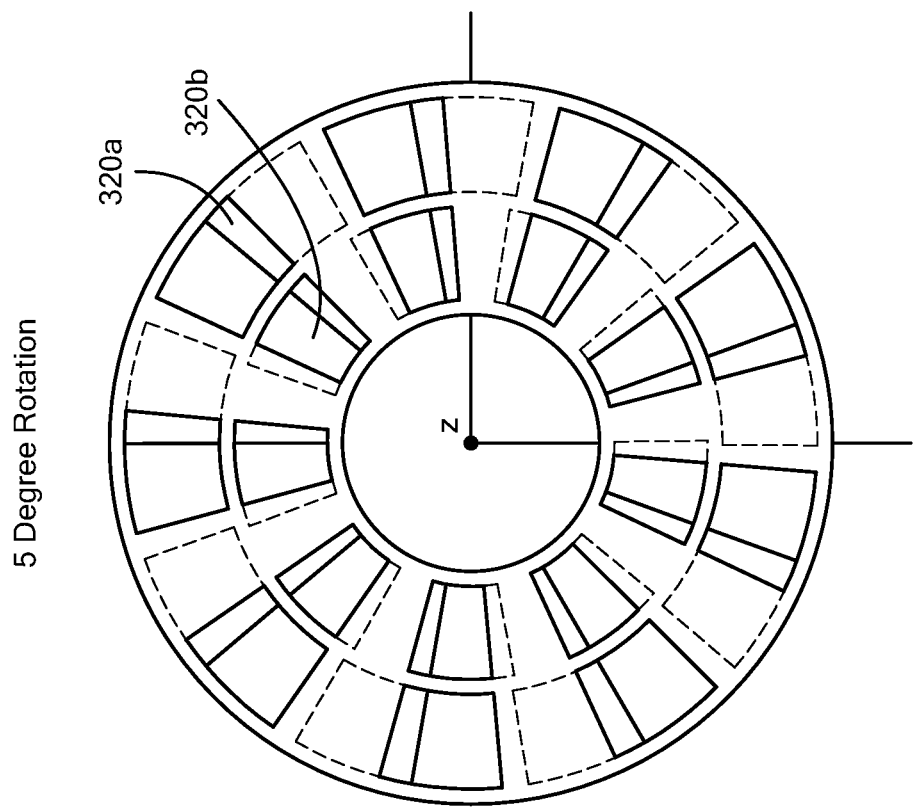
FIG. 3D shows the first and second targets in an example five degree rotation from the nominal position of FIG. 3C.
Figure 3C:
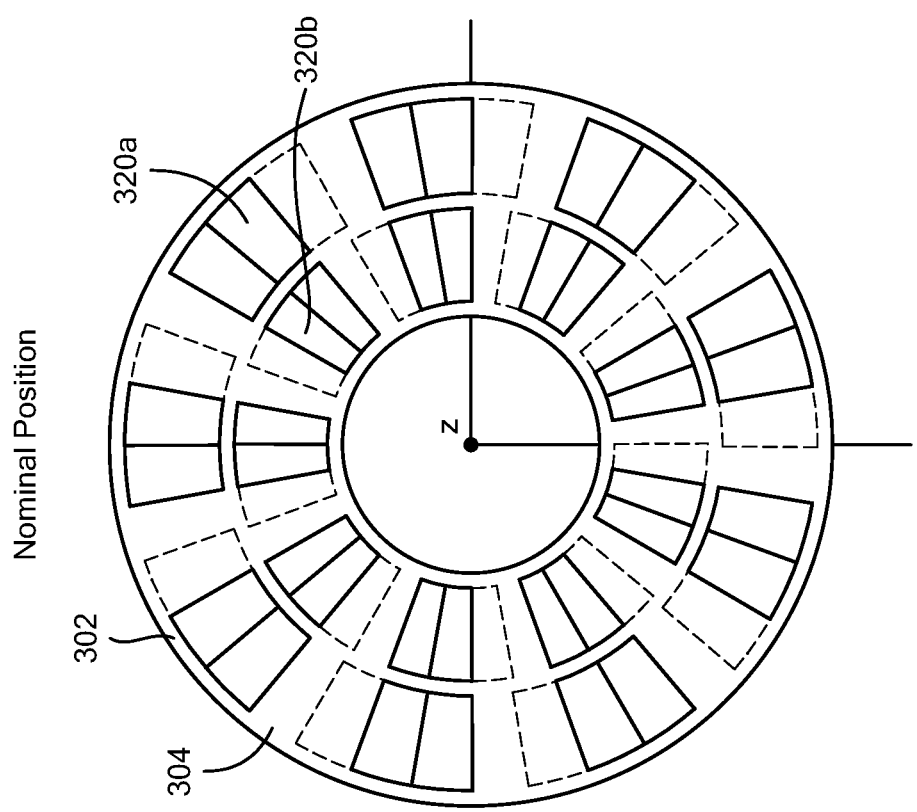
FIG. 3C shows the first and second targets in a nominal position.

FIG. 3A shows an example configuration for a first target 300, FIG. 3B shows an example configuration for a second target 302, FIG. 3C shows the first and second targets 300, 302 at some nominal position relative to each other, and FIG. 3D shows a displacement of five degrees from the nominal position in FIG. 3C. In the illustrated embodiment, the first target 300 comprises open regions 304 and closed/intact regions 306. A first annular region 308 comprises outer open and intact regions 304, 306 and a second annular region 310 comprises inner open and intact regions 304, 306. In the illustrated embodiment, open and intact regions 304, 306 in the inner and outer regions 308, 310 alternate along a radial line from the center of the first target 300. The second target 302 comprises first and second annual regions 312, 314 with aligned open and intact regions 316, 318.

As shown in FIG. 3C, windows 320 are defined by overlap between the open and intact regions the first and second targets 300, 302. As can be seen in the nominal position of FIG. 3C, windows 320a in the outer annular regions 308, 312 of the first and second targets 300, 302 and windows 320 in the inner annular regions 310, 314 are about one half of maximum possible size. In the rotated position of FIG. 3D, the outer windows 320a are decreased in size and the inner windows 320b are increased in size from the nominal position due to relative motion of the first and second targets 300, 302. The change in target overlap and window size can be differentially sensed to determine torque on an elongate member.

In embodiments, there is more conductive area provided by the first and second targets 300, 302 in the outer windows 320 in the position of FIG. 3D which results in more reflected field detected by the outer loop 608 of the ring coil (FIG. 6A) and less reflected field detected by the inner loop 610 of the ring coil. The fields detected by the inner and outer loops of the receive coil can be differentially combined to determine the relative position of the first and second targets.

It is understood that that the first and second targets are one or more skin depths thick so that as the targets overlap, the coil does not see the area of the target that went behind the other target.

In embodiments, a system transmits an AC magnetic field with a transmit coil toward a conductive target and receives a field reflected by the conductive target with a receive coil. The conductive target can comprise first and second targets 300, 302 positioned with respect to each other and each shaped to linearly increase or decrease an amount of conductive area of the conductive target due to relative movement of the first and second targets which changes an amount of the field reflected by the conductive target. The sensing system can process a signal from the receive coil to determine a relative position of the first and second targets 300, 302 corresponding to an amount of torque on an elongate member connected to the first and second targets.

It is understood that a wide variety of target configurations and geometries can be used to meet the needs of a particular application. In addition, target configurations can be selected based on any practical number of criteria, such as torque resolution, manufacturability, mechanical robustness, etc. Further, any practical number of targets can be used. In some embodiments, only one target moves, e.g., rotates.

In embodiments, targets are ring-shaped to facilitate relative rotation so that target coverage in one ring increases while the other decreases. It will be appreciated that ring-shaped targets can rotate together, e.g., a steering column rotates >360 degrees, so that the total covered area seen by the receive or pick-up coil section for each ring stays constant. Differences are generated when the targets rotate relative to each other.

In some embodiments, the areas of ring targets are balanced to keep the total area of the drive coil covered by target constant so as to keep the drive coil inductance constant, as well as generating a linear output signal rather than having a curvature. In some embodiments, the signal strength from the drive coil is stronger in some areas for which compensation may be performed.

Example targets may contain any practical number of open and intact/closed regions, which may be considered teeth. The number of teeth in the targets may be selected based on a desired measurement range. For example, to measure +/−10 degrees, each tooth should be about 20 degrees.

Figure 4A:
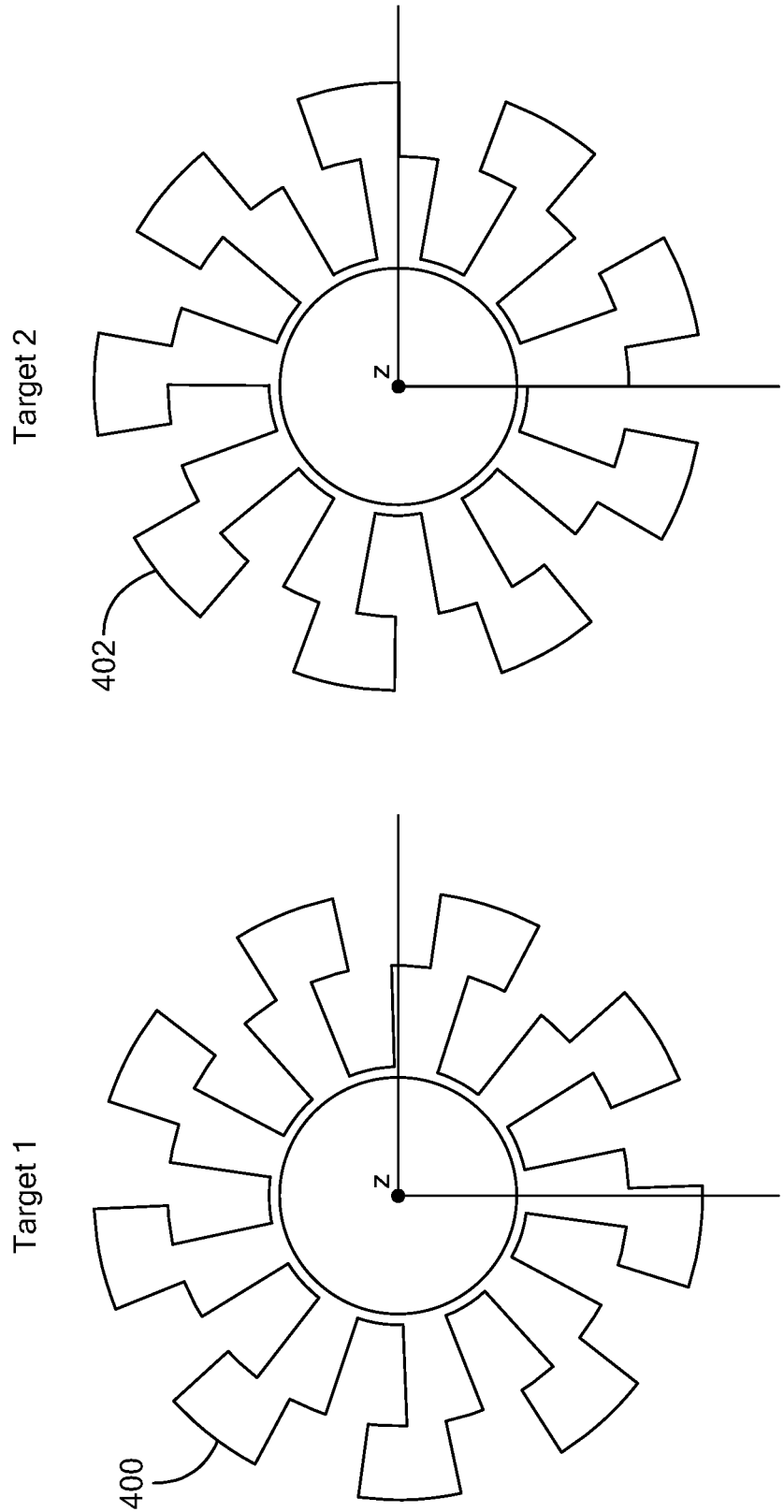
FIG. 4A shows example configurations for first and second targets.
Figure 4B:
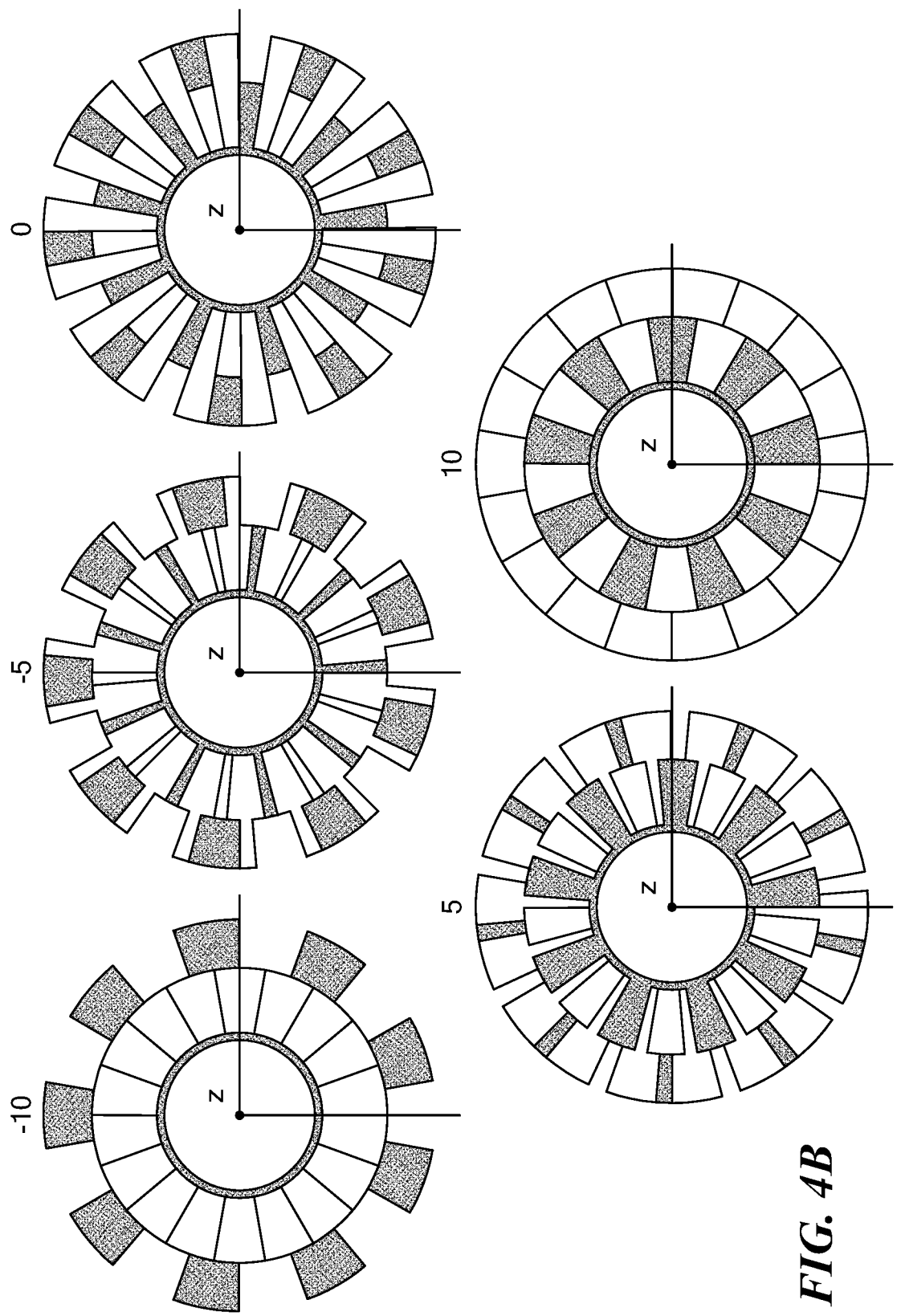
FIG. 4B shows the first and second targets in relative positions of −10 degrees, −5 degrees, 0 degrees, 5 degrees, and 10 degrees.

FIG. 4A shows example configurations for a first target 400 and a second target 402 with increased sensing area and enhanced mechanical strength over the targets 300, 302 of FIGS. 3A and 3B provided by more material at the interface of the inner and outer annual regions. FIG. 4B shows the overlap/positions of the first and second targets 400, 402 for relative positions in degrees of −10, −5, 0, +5, +10. As can be seen, the overlap of the targets defines windows that vary size in each of the inner and outer annular regions based on the relative positions of the first and second targets.

Figure 5A:
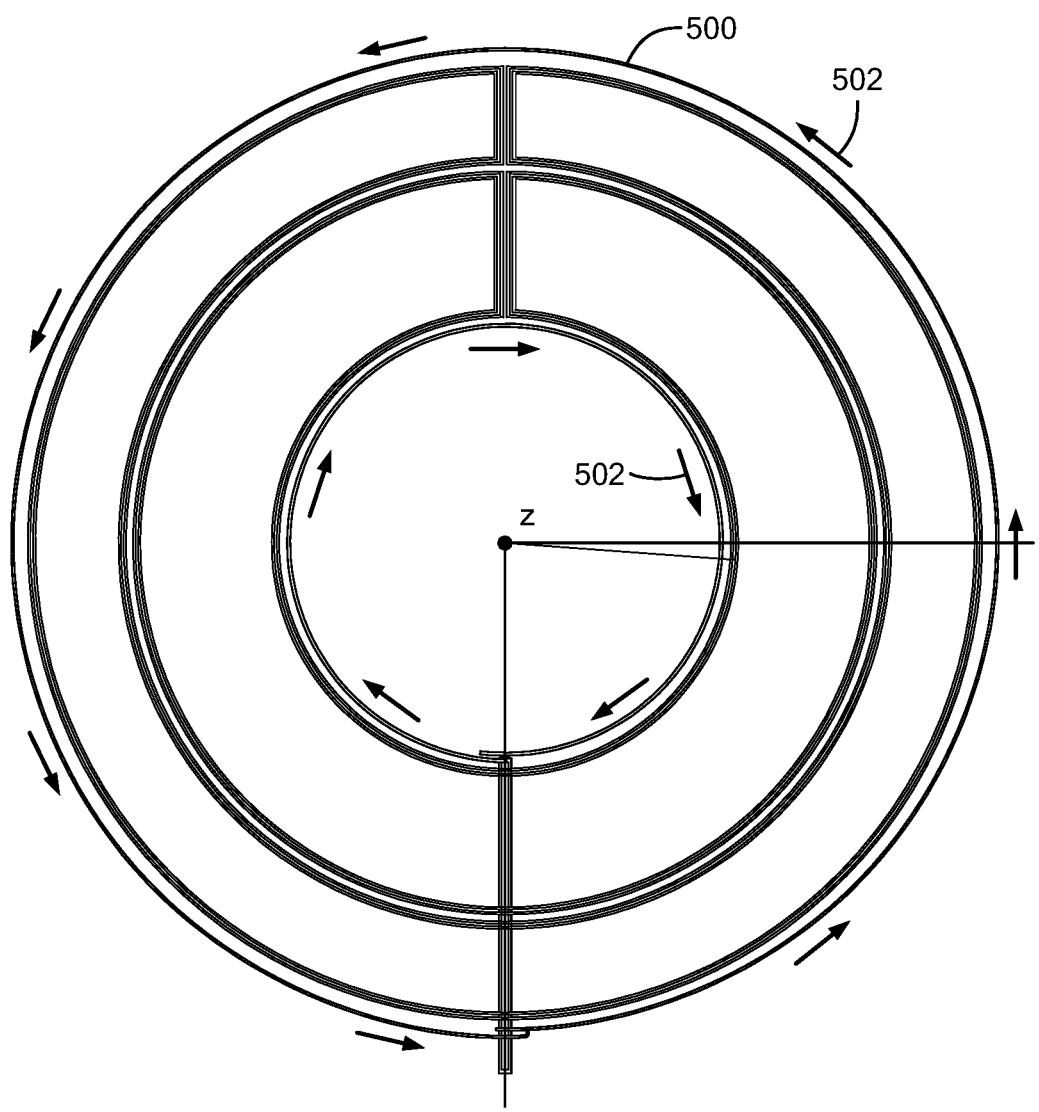
FIG. 5A shows an example configuration for transmit and receive coils with transmit coil winding polarity.

FIG. 5A shows an example transmit coil 500 configured to create field in one direction (phase) in the total target area with first arrows 502 indicating the winding direction of the transmit coil. A receive coil 504 is also shown.

Figure 5B:
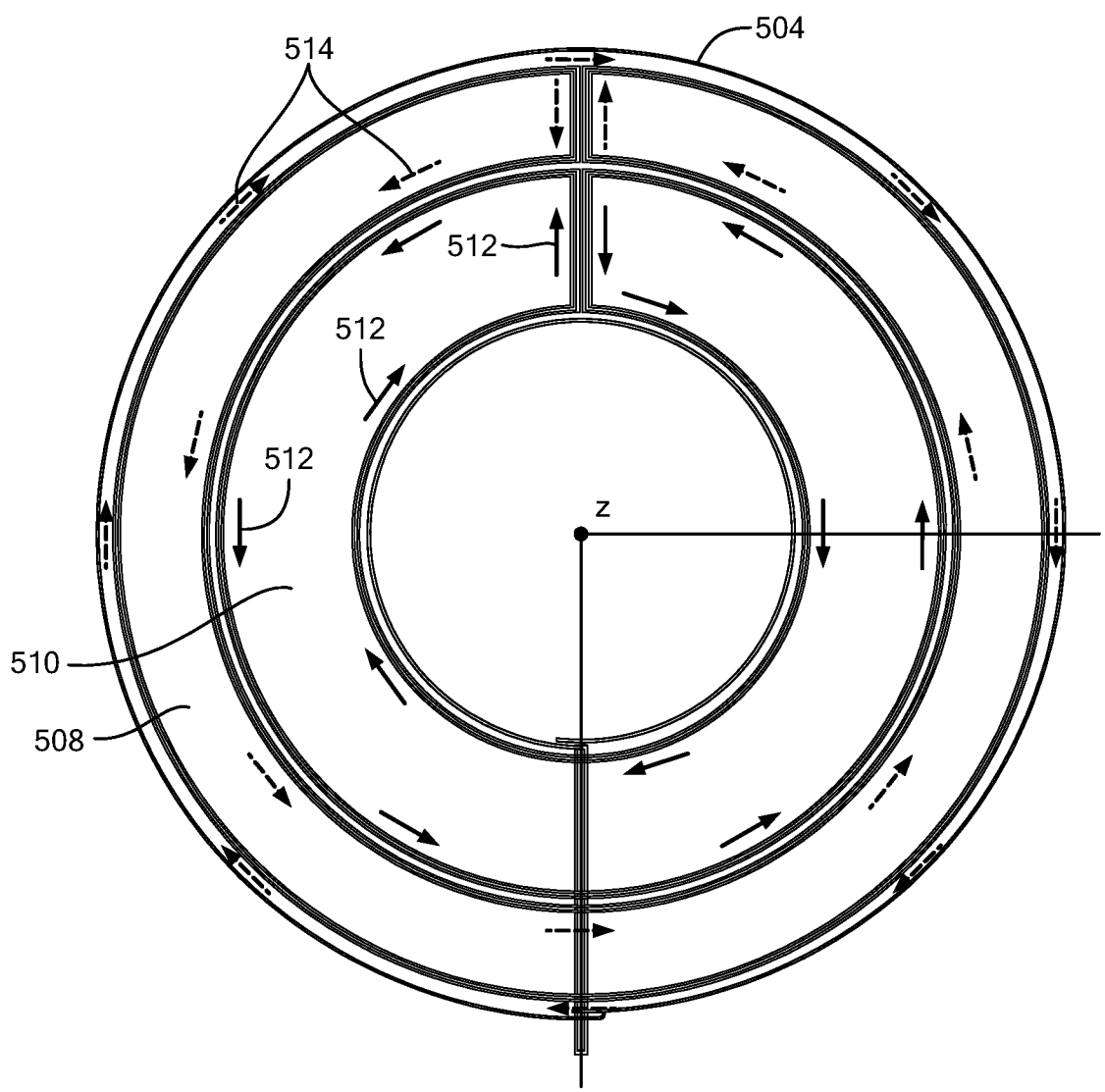
FIG. 5B shows the transmit and receive coil configuration of FIG. 5A with polarity for inner and outer loops of the receive coil.

FIG. 5B shows an example receive coil 504 configured to receive reflected signal from the target. The receive coil picks up field in one direction in an outer ring 508 and in the opposite direction in an inner ring 510. This effectively cancels out the back bias from the transmit/drive coil 500 so that the receive coil 504 only picks up the differences in reflections between the inner and outer rings due to the amount of target coverage, e.g., amount of conductive area of the first and second targets. Second arrows 512 show the direction of winding for the inner loop 510 and third arrows 514 show the direction for the outer loop 508. The first and second loops 508/510 are connected together to create one receive coil that differentially picks up the change in relative target rotation.

In some embodiments, the receive coil can include any practical number of independent coils to meet the needs of a particular application.

Figure 6A:
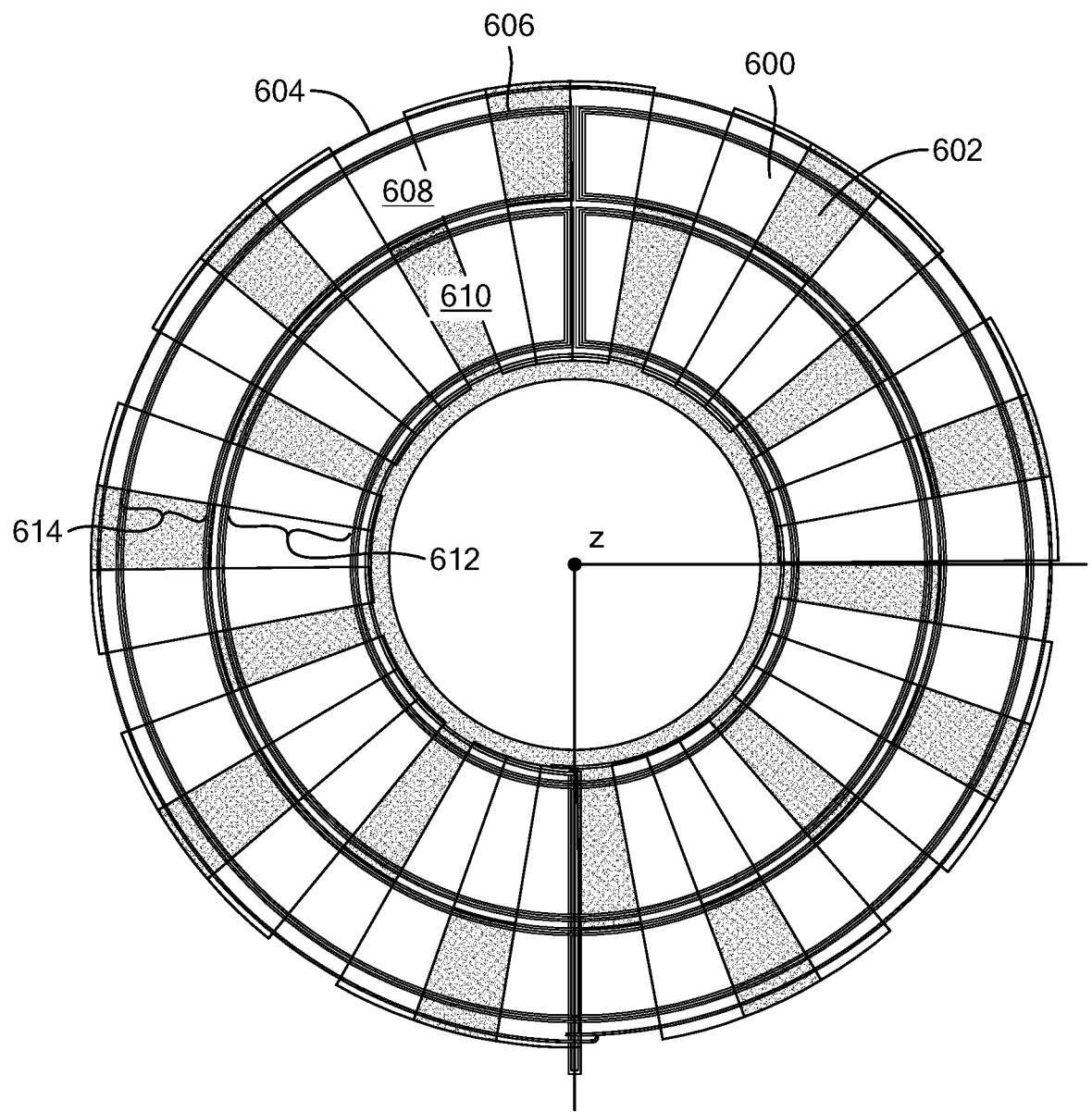
FIG. 6A shows a coil and target configuration having a width of the inner and outer loops of the receive coil corresponding to respective annular regions of the first and second targets.

FIG. 6A shows overlapping first and second targets 600, 602, a transmit coil 604 and a receive coil 606 having outer and inner loops 608, 610. In example embodiments, the width of the inner loop 608 corresponds to a width of an inner annular region 612 of the first and second targets and a width of the outer loop 610 corresponds to a width of an outer annual region 614 of the targets. With this arrangement, the inner loop 608 receives signal reflections based on the amount of overlap between the first and second targets 600, 602 in the inner annular region 612 and the outer loop 610 receives signal reflections based on the amount of overlap between the targets in the outer annular region 614. The signals from the inner and outer loops 608, 610 can be differentially combined to generate relative target position from which the amount of torque can be determined.

Figure 6B:
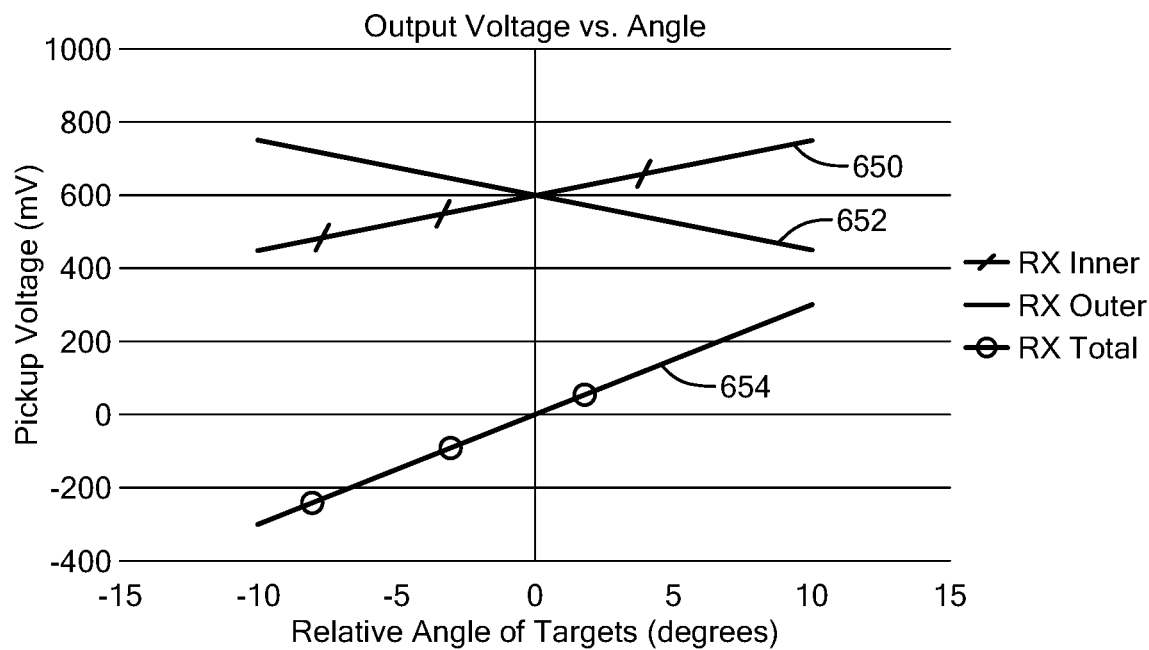
FIG. 6B is a waveform diagram showing signals from inner and outer receive coil loops and a differential output signal.

FIG. 6B shows an example signal 650 from an inner receive coil loop 610 and an example signal 652 from an outer receive coil loop 608. The targets generating the signals may comprise the first and second targets 400, 402 of FIG. 4. Back bias from a transmit coil 604 is shown as creating 600 mV in both the inner and outer portions 610, 608 of the receive coil. At −10 degrees, the reflection is strongest in the inner ring signal 650 resulting in lower output voltage there, as the reflection is opposite to the transmitted field. In embodiments, the inner and outer receive coils 610, 608 are connected such that the inner coil signal 650 is subtracted from the outer coil signal 652 which results in the output signal 654. In embodiments the output signal 654 is linear and may be centered at zero. In the illustrative configuration, the total target area seen by the transmit coil 604 is constant so that the transmit inductance will be flat over the relative angle motion of the targets.

In some embodiments, relative target position is determined based on inductive changes in the transmit coil so that a receive coil may not be necessary. As first and second targets rotate relative to each other, the inductance of the transmit coil changes linearly. Based on inductance change, the relative position of the first and second targets can be determined.

Figure 6C:
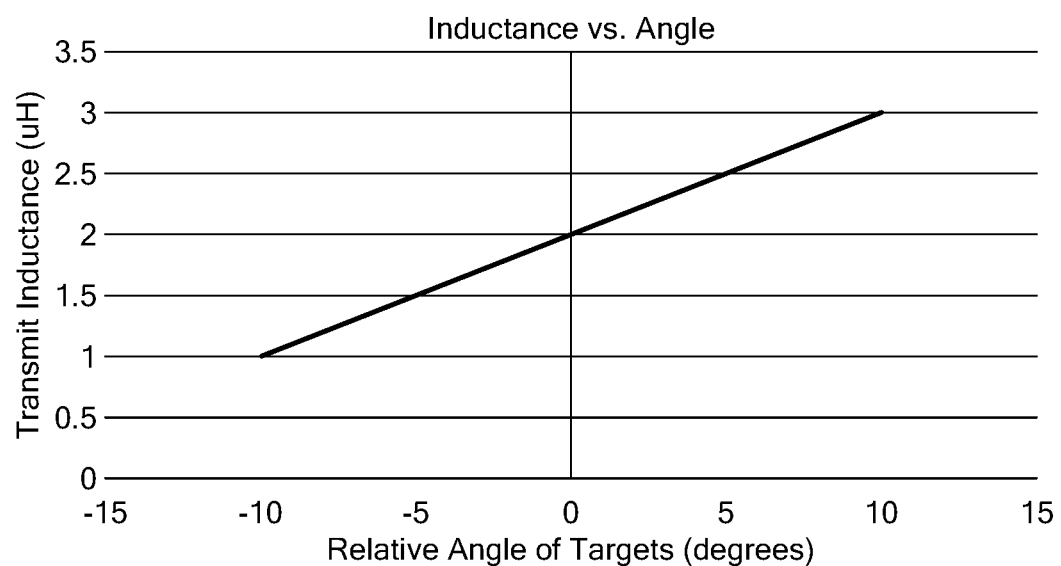
FIG. 6C is a waveform diagram showing an example transmit coil inductance change versus relative target angle.
Figure 6D:
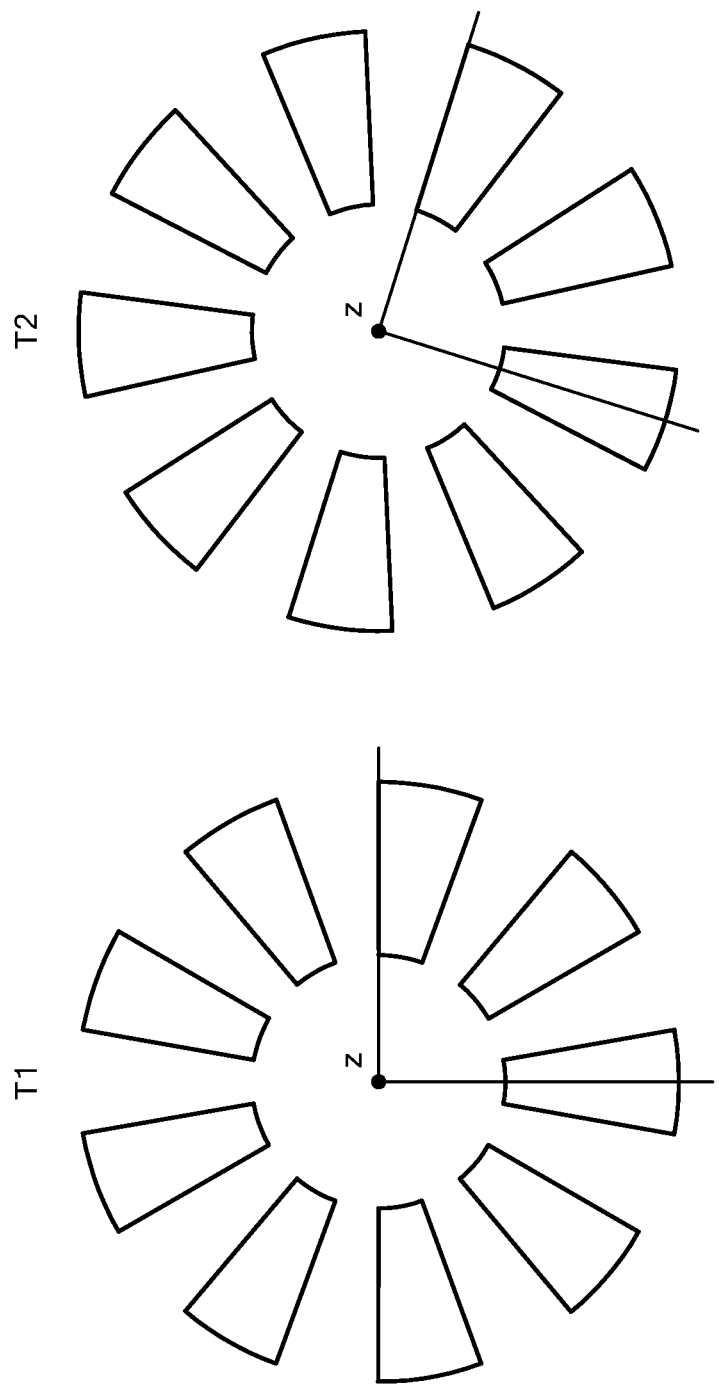
FIG. 6D shows an example target having identically shaped rings that may generate the waveform of FIG. 6C.

FIG. 6C is an example waveform for transmit coil inductance versus relative target angle, such as for the identical targets T1, T2 of FIG. 6D. If two identical targets are rotated relative to each other, such that the area coverage of the target increases with angle, the transmit coil inductance also increases with angle.

In some embodiments, the transmit and/or receive coil do not cover the entire target. The receive and/or transmit coil may cover only a portion of the targets.

Figure 7:
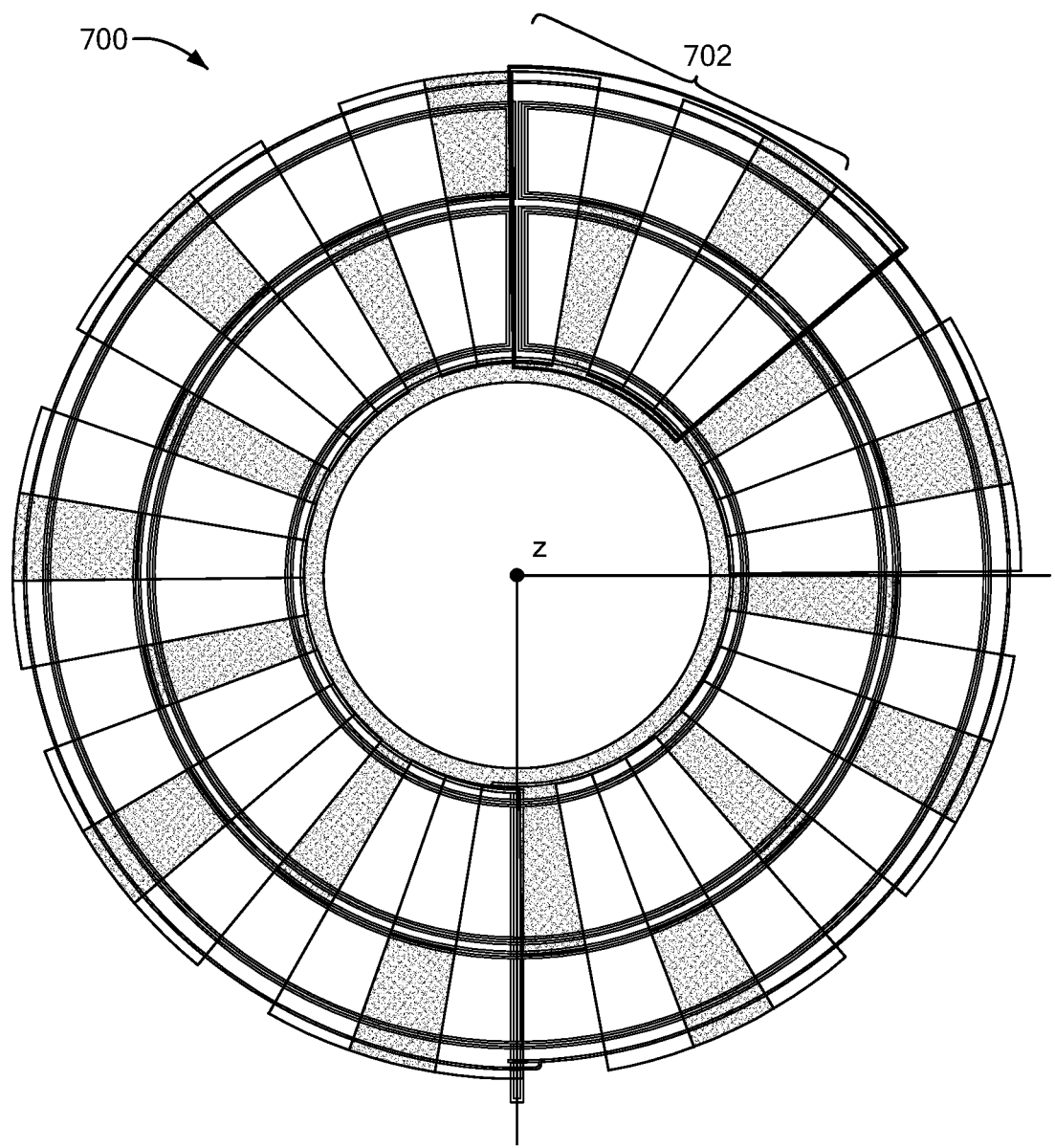
FIG. 7 shows the coil and target configuration of FIG. 6 with a sensing region comprising a portion of the coil and target configuration.

FIG. 7 shows a sensing system 700 having a coil and target configuration in which there is less than 360 degree coverage. In embodiments, a region 702 covers an integer number of teeth and valleys of the targets. With this arrangement, the circuit board does not have to surround the elongate member, e.g., steering column, thereby making it easier to install the circuit board. In addition, multiple torque sensors and/or circuit boards can be located in different arcs/regions of the targets, which makes it easier to have fully separate systems.

Figure 8:
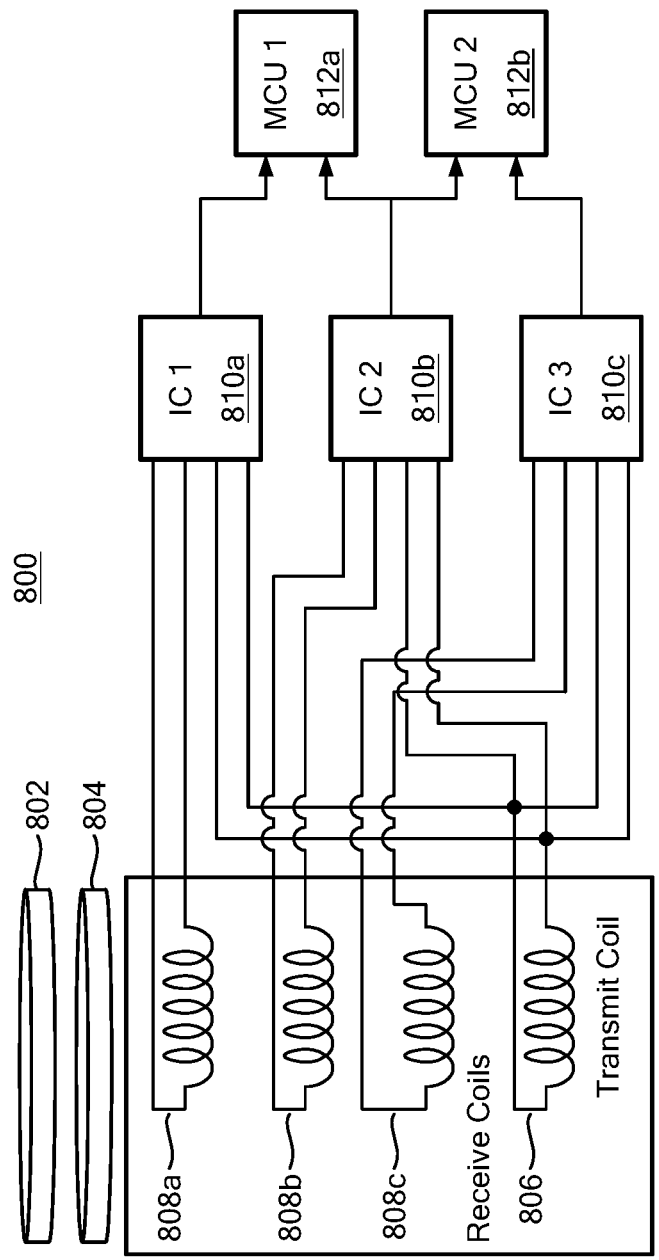
FIG. 8 shows an example linear inductive torque sensing system having redundancy.

FIG. 8 shows a block diagram 800 of an example implementation of an inductive sensing system having sensing redundancy. In the illustrated embodiment, first and second targets 802, 804 are positioned in relation to a transmit coil 806 and first, second, and third receive coils 808a,b,c. In the illustrative embodiment, first, second, and third sensor ICs 810a,b,c are used to provide redundancy. The sensor ICs 810a,b,c are coupled to the transmit coil 806. The first receive coil 808a is coupled to the first sensor IC 810a, the second receive coil 808b is coupled to the second sensor IC 810b, and the third receive coil 808c is coupled to the third sensor IC 810c.

In embodiments, the sensor ICs 810a,b,c can be coupled to one or more control units 812a,b for monitoring torque information. In the illustrated embodiment, the first control unit 812a is coupled to the first and second sensor ICs 810a,b and the second control unit 812b is coupled to the second and third sensor ICs 810b,c.

It is understood that for fail safe operation, two sensor ICs 810 can be used. For fail operational, three sensors 810 can be used. In the illustrated fail operational embodiment, if one sensor fails, then you can still operate with two redundant sensors. In other embodiments, the three sensor ICs 810a,b,c can be fed into each of the control units 812 to provide voting capability.

It is understood that any practical number of transmit coils and any practical number of receive coils can be used to meet the needs of a particular application. In addition, each sensor IC may run at different frequencies to minimize adjacent interference.

Example embodiments of the disclosure providing differential signal measurements may provide advantages over known systems. For example, conventional systems that measure the position of each target separately may require at least four pick-up coils and channels (front ends and ADCs) to measure torque. To provide redundancy in conventional systems may require twelve coils and fail operational may require eighteen coils.

In contrast, embodiments of the disclosure may use one pick-up coil to measure torque and an optional coil for normalization signal to reduce the number of coils and high resolution ADCs by at least four times as compared to conventional systems. This greatly simplifies and reduces the cost of circuit board design, coil layers, board size, IC count, and the like.

Figure 9:
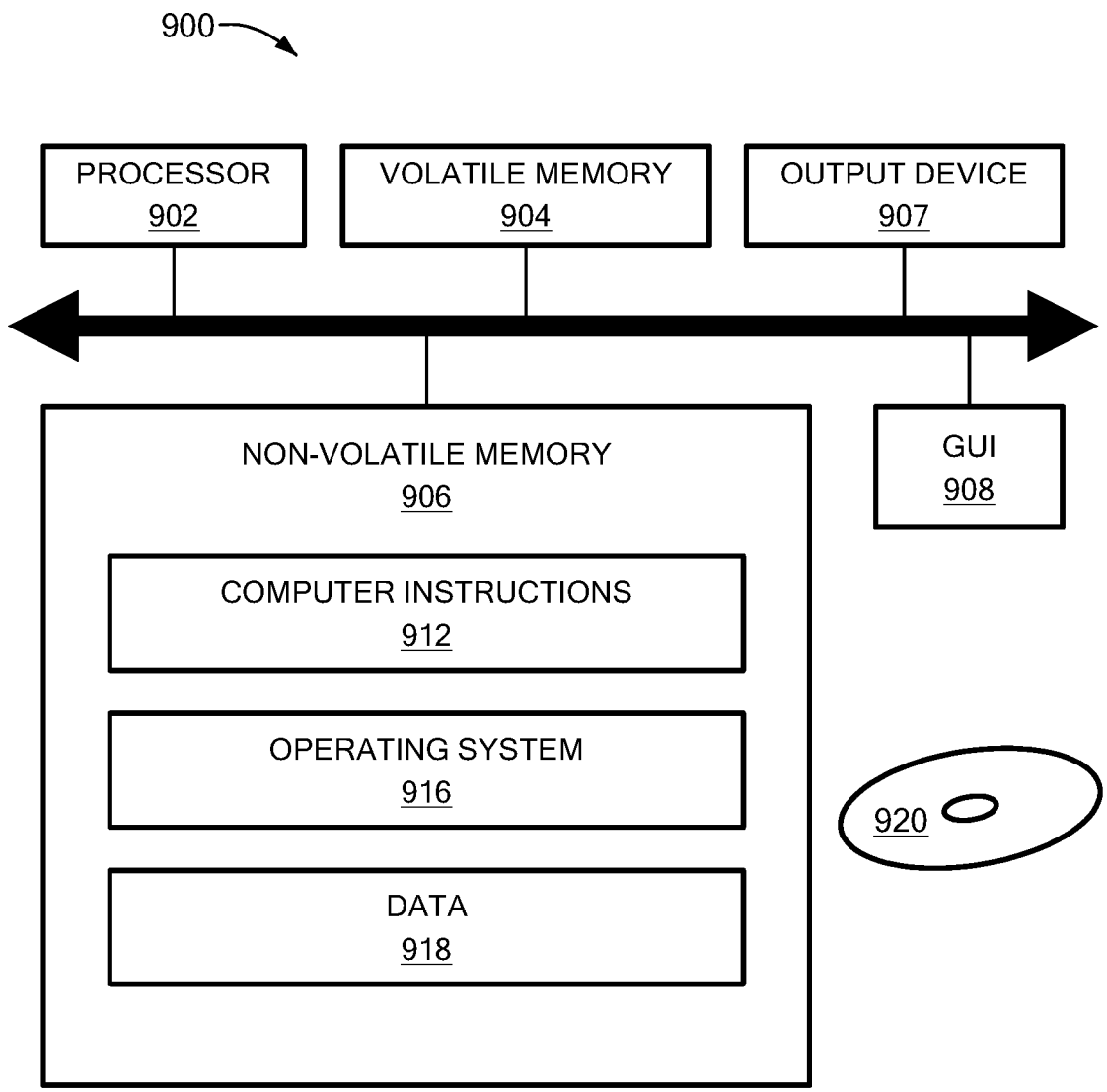
FIG. 9 is a schematic representation of an example computer that can perform at least a portion of the processing describe herein.

FIG. 9 shows an exemplary computer 900 that can perform at least part of the processing described herein. The computer 900 includes a processor 902, a volatile memory 904, a non-volatile memory 906 (e.g., hard disk), an output device 907 and a graphical user interface (GUI) 908 (e.g., a mouse, a keyboard, a display, for example). The non-volatile memory 906 stores computer instructions 912, an operating system 916 and data 918. In one example, the computer instructions 912 are executed by the processor 902 out of volatile memory 904. In one embodiment, an article 920 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The system can perform processing, at least in part, via a computer program product, (e.g., in a machine-readable storage device), for execution by, or to control the operation of, data processing apparatus (e.g., a programmable processor, a computer, or multiple computers). Each such program may be implemented in a high-level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., RAM/ROM, CD-ROM, hard disk, or magnetic diskette) that is readable by a general or special purpose programmable computer for configuring and operating the computer when the storage medium or device is read by the computer.

Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array), a general purpose graphical processing units (GPGPU), and/or an ASIC (application-specific integrated circuit)).

Having described exemplary embodiments of the disclosure, it will now become apparent to one of ordinary skill in the art that other embodiments incorporating their concepts may also be used. The embodiments contained herein should not be limited to disclosed embodiments but rather should be limited only by the spirit and scope of the appended claims.

All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable subcombination. Other embodiments not specifically described herein are also within the scope of the following claims.

The invention claimed is:

1. A method, comprising:
    transmitting an AC magnetic field with a transmit coil toward a conductive target;
    receiving a field reflected by the conductive target with a receive coil, wherein the conductive target comprises first and second targets positioned with respect to each other and each shaped to linearly increase or decrease an amount of conductive area of the conductive target hit by the transmit field due to relative movement of the first and second targets, which changes an amount of the field reflected by the conductive target; and
    processing a signal from the receive coil to determine a relative position of the first and second targets corresponding to an amount of torque on an elongate member connected to the first and second targets,
    wherein the first and second targets have a ring-shape, and wherein relative rotation of the first and second targets in a first direction increases the conductive area of the conductive target in the inner region and decreases the conductive area of the conductive target in the outer region.

2. The method according to claim 1, wherein the first and second targets have substantially identical size.

3. The method according to claim 1, wherein the first and second targets have substantially identical conductive area.

4. The method according to claim 1, wherein the receive coil comprises an inner region and an outer region.

5. The method according to claim 1, wherein the transmit coil is configured to transmit the AC magnetic field to cover the total area of the conductive target.

6. The method according to claim 1, wherein the receive coil inner region is wound in an opposite direction as the outer region.

7. The method according to claim 1, wherein relative rotation of the first and second targets in a second direction opposite the first direction decreases the conductive area of the conductive target in the inner region and increases the conductive area of the conductive target in the outer region.

8. The method according to claim 1, wherein the first and second targets have a ring-shape, and wherein the receive coil comprises an inner region and an outer region that are separate coils.

9. The method according to claim 1, wherein the first and second targets have a ring-shape each having an inner annular area having a first width and an outer annular area having a second width, wherein the receive coil comprises an inner region with the first width and an outer region having the second width.

10. The method according to claim 1, wherein the first target, the second target, and a circuit board having a sensor IC are stacked parallel to each other.

11. The method according to claim 1, wherein the transmit and receive coil cover an integer number of teeth of the first target.

12. A sensing system, comprising:
    a transmit coil to transmit an AC magnetic field toward a conductive target;

a receive coil to receive a field reflected by the conductive target, wherein the conductive target comprises first and second targets positioned with respect to each other and each shaped to linearly increase or decrease an amount of conductive area of the conductive target hit by the transmit field due to relative movement of the first and second targets, which changes an amount of the field reflected by the conductive target; and a circuit to process a signal from the receive coil to determine a relative position of the first and second targets corresponding to an amount of torque on an elongate member connected to the first and second targets, wherein the first and second targets have a ring-shape, and wherein relative rotation of the first and second targets in a first direction increases the conductive area of the conductive target in the inner region and decreases the conductive area of the conductive target in the outer region.

13. The system according to claim 12, wherein the first and second targets have substantially identical size.

14. The system according to claim 12, wherein the first and second targets have substantially identical conductive area.

15. The system according to claim 12, wherein the receive coil comprises an inner region and an outer region.

16. The system according to claim 12, wherein the transmit coil is configured to transmit the AC magnetic field to cover the total area of the conductive target.

17. The method according to claim 12, wherein the receive coil inner region is wound in an opposite direction as the outer region.

18. The system according to claim 12, wherein relative rotation of the first and second targets in a first direction increases the conductive area of the conductive target in the inner region and decreases the conductive area of the conductive target in the outer region.

19. The system according to claim 18, wherein relative rotation of the first and second targets in a second direction opposite the first direction decreases the conductive area of the conductive target in the inner region and increases the conductive area of the conductive target in the outer region.

20. The system according to claim 12, wherein the first and second targets have a ring-shape, and wherein the receive coil comprises an inner region and an outer region that are separate coils.

21. The system according to claim 12, wherein the first and second targets have a ring-shape each having an inner annular area having a first width and an outer annular area having a second width, wherein the receive coil comprises an inner region with the first width and an outer region having the second width.

22. The system according to claim 12, wherein the first target, the second target, and a circuit board having a sensor IC are stacked parallel to each other.

23. The system according to claim 12, wherein the transmit and receive coil cover an integer number of teeth of the first target.

* * * * *